United States Patent
Choi et al.

(10) Patent No.: US 12,479,296 B1
(45) Date of Patent: Nov. 25, 2025

(54) PARALLEL PARKING ASSIST SYSTEM FOR NARROW PARKING SPACES

(71) Applicant: GM Global Technology Operations LLC, Detroit, MI (US)

(72) Inventors: Ji-In Choi, Yeongju-si (KR); Chuljin Lee, Incheon (KR); Kijung Kim, Gangseo-gu (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 56 days.

(21) Appl. No.: 18/672,184

(22) Filed: May 23, 2024

(51) Int. Cl.
*B60K 35/10* (2024.01)

(52) U.S. Cl.
CPC ...... *B60K 35/10* (2024.01); *B60K 2360/1438* (2024.01)

(58) Field of Classification Search
CPC .......................... B60K 35/10; B60K 2360/1438
See application file for complete search history.

(56) References Cited

U.S. PATENT DOCUMENTS

2022/0012775 A1\* 1/2022 Allexi ................. G07B 15/063

FOREIGN PATENT DOCUMENTS

| WO | WO-2021110629 A1 \* | 6/2021 | ............. B60K 35/10 |
| WO | WO-2021148205 A1 \* | 7/2021 | ............. G08C 17/02 |

\* cited by examiner

*Primary Examiner* — Joseph J Dallo
(74) *Attorney, Agent, or Firm* — Vivacqua Crane, PLLC

(57) ABSTRACT

A method for externally moving a vehicle includes receiving sensor data from a sensor of the vehicle. The sensor data is indicative that a person outside of the vehicle touched a predetermined area of the windshield of the vehicle. The vehicle is initially parked. The method further includes displaying a user interface on the predetermined area of the windshield in response to determining that the person outside of the vehicle touched the predetermined area of the windshield of the vehicle. Moreover, the method includes receiving an input from the person outside of the windshield through the user interface. The input is indicative of a command to move the vehicle. The method includes commanding the vehicle to move by a predetermined distance in response to receiving the input from the person outside of the vehicle.

20 Claims, 2 Drawing Sheets

PARALLEL PARKING ASSIST SYSTEM FOR NARROW PARKING SPACES

INTRODUCTION

The present disclosure relates to a parallel parking assist system and method for navigating narrow parking spaces.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

In situations where parking spaces are narrow or congested, it is often challenging to find available parking spaces because other vehicles are already parked. In such circumstances, there is a tendency to parallel park in front of vehicles that are already parked to make the most of the available space. Consequently, to maneuver their vehicles, drivers parked along the parking lines may need to push and move nearby vehicles parallel-parked in front of them. However, individuals with insufficient strength may face difficulties in this process. Parking lots with slippery surfaces or during rainy weather can significantly reduce friction, making it extremely challenging to move the vehicles. It is therefore desirable to design a system to assist in the movement of parallel-parked vehicles in tight spaces.

SUMMARY

A method for externally moving a vehicle includes receiving sensor data from a sensor of the vehicle. The sensor data is indicative that a person outside of the vehicle touched a predetermined area of the windshield of the vehicle. The vehicle is initially parked. The method also includes displaying a user interface on the predetermined area of the windshield in response to determining that the person outside of the vehicle touched the predetermined area of the windshield of the vehicle. The method also includes receiving an input from the person outside of the windshield through the user interface. The input is indicative of a command to move the vehicle. The method also includes commanding the vehicle to move by a predetermined distance in response to receiving the input from the person outside of the vehicle. The method described in this paragraph improves vehicle technology by allowing a person external to the vehicle to move the vehicle to facilitate parking.

The method may include sending an approval request to a vehicle user in response to determining that the person outside of the vehicle touched the predetermined area of the windshield of the vehicle. The vehicle user is at a location remote from the vehicle. The method may include receiving an approval signal from the vehicle user in response to sending the approval request to the vehicle user. Further, the method includes displaying a ready-message on the user interface in response to receiving the approval signal from the vehicle user. The user interface displays a first arrow button and a second arrow button. The first arrow button is indicative of a forward movement by the vehicle. The second arrow button is indicative of a backward movement by the vehicle. The user interface includes a touchscreen accessible from outside the vehicle. The user interface displays a stop button. The first arrow button, the second arrow button, and the stop button are virtual images displayed on the predetermined area of the windshield of the vehicle. The person outside the vehicle sends the stop command by pressing the stop button. The method includes commanding the vehicle to stop in response to receiving the stop command.

The present disclosure also describes a system for externally moving a vehicle. The system includes a sensor configured to generate sensor data. The sensor data is indicative that a person outside of the vehicle touched a predetermined area of the windshield of the vehicle. The system further includes a controller in communication with the sensor. The controller is programmed to execute the method described above.

The present disclosure also describes a vehicle. The vehicle includes a windshield and a user interface displayed on the windshield. Further, the vehicle includes a sensor configured to generate sensor data. The sensor data is indicative that a person outside of the vehicle touched a predetermined area of the windshield of the vehicle. The system further includes a controller in communication with the sensor. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
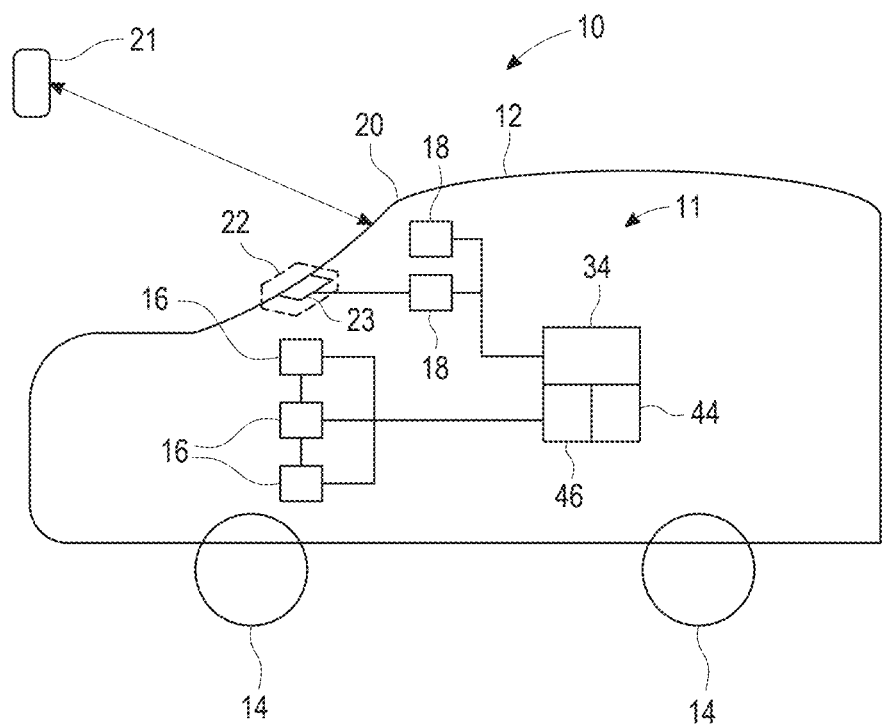
FIG. 1 is a schematic diagram of a vehicle including a parallel parking assist system.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a vehicle body 12 and a plurality of wheels 14 coupled to the vehicle body 12. The vehicle 10 may be an autonomous vehicle. In the depicted embodiment, the vehicle 10 may be a sedan, a truck, a coupe, a sport utility vehicle (SUV), a recreational vehicles (RV). The vehicle 10 further includes a parallel parking assist system 11 to assist a user move a park the vehicle 10 from a location outside the vehicle 10.

The vehicle 10 further includes one or more actuators 16 that control one or more vehicle features such as, but not limited to, the propulsion system (e.g., electric motor and/or internal combustion engine), the transmission system, accelerator pedal, brake pedal, the steering system, and the brake system. The actuators 16 are in communication with a controller 34. Therefore, the controller 34 is programmed to control the operation of the actuators 16. For instance, the controller 34 is programmed to control the operation of the propulsion system and/or of the steering system to control the steering of the vehicle 10.

Further, the vehicle 10 includes a controller 34 and one or more sensors 18 in communication with the controller 34. The sensors 18 collect information and generate sensor data indicative of the collected information. As non-limiting examples, the sensors 18 may include Global Navigation Satellite System (GNSS) transceivers or receivers, inertial measurement unit (IMU), yaw rate sensors, ride height sensors, speed sensors, lidars, radars, knock sensors, touch sensors, vibration sensors, ultrasonic sensors, and cameras, among others. At least one of the sensors 18 is configured to sense whether a person outside of the vehicle 10 touched (e.g., knocked) a predetermined area 22 of a windshield 20 of the vehicle 10. In such case, the sensor 18 generates sensor data indicative that a person outside of the vehicle 10 touched the predetermined area 22 of the windshield 20 of the vehicle 10. Suitable sensors 18 capable of detecting whether a person outside the vehicle 10 has touched (e.g., knocked), and the vehicle is initially parked. The sensor 18 may also be in the form of a touchscreen that can detect a touch by the person outside of the vehicle 10. The vehicle 10 is initially parked and its transmission is in its neutral state.

The controller 34 is programmed to receive sensor data from the sensors 18 and includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators 16 to automatically control the components of the vehicle 10 based on the logic, calculations, methods, and/or algorithms. Although a single controller 34 is shown in FIG. 1, the parallel parking assist system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 3), that when executed by the one or more processors, cause the processors 44 to execute the method 100 (FIG. 2).

Figure 2:
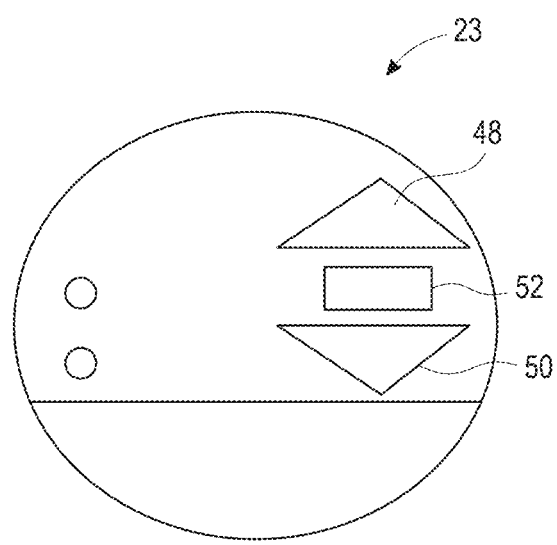
FIG. 2 is a schematic diagram of a user interface of the parallel parking assist system of FIG. 1.

With reference to FIGS. 1 and 2, the vehicle 10 includes a user interface 23, which may be a touchscreen displayed on the predetermined area 22 of the windshield 20. The touchscreen can detect when a person outside the vehicle 10 touches (e.g., knocks) the user interface 23. The user interface 23 may display messages (e.g., "knock", "ready", "stop", "when the Ready light is on, operate using the forward or backward buttons", etc.). The user interface 23 may display virtual buttons, such a first or forward arrow button 48 and a second or backward arrow button 50. The first arrow button 48 is indicative of a forward movement by the vehicle 10. The second arrow button 50 is indicative of a backward movement by the vehicle 10. The user interface 23 may also include a stop button 52. The first arrow button 48, the second arrow button 50, and the stop button 50 may be virtual images displayed on the predetermined area 22 of the windshield 20 of the vehicle 10. The user interface 23 is in electronic communication with the controller 34 and is configured to receive inputs by a user (e.g., a person outside the vehicle 10). For example, the user interface 23 may include a touch screen and/or buttons configured to receive inputs from a person. Accordingly, the controller 34 is configured to receive inputs from the user via the user interface 23. The user interface 23 is also configured to output messages via the display and/or speaker. For example, the user interface 23 may output a message.

Figure 3:
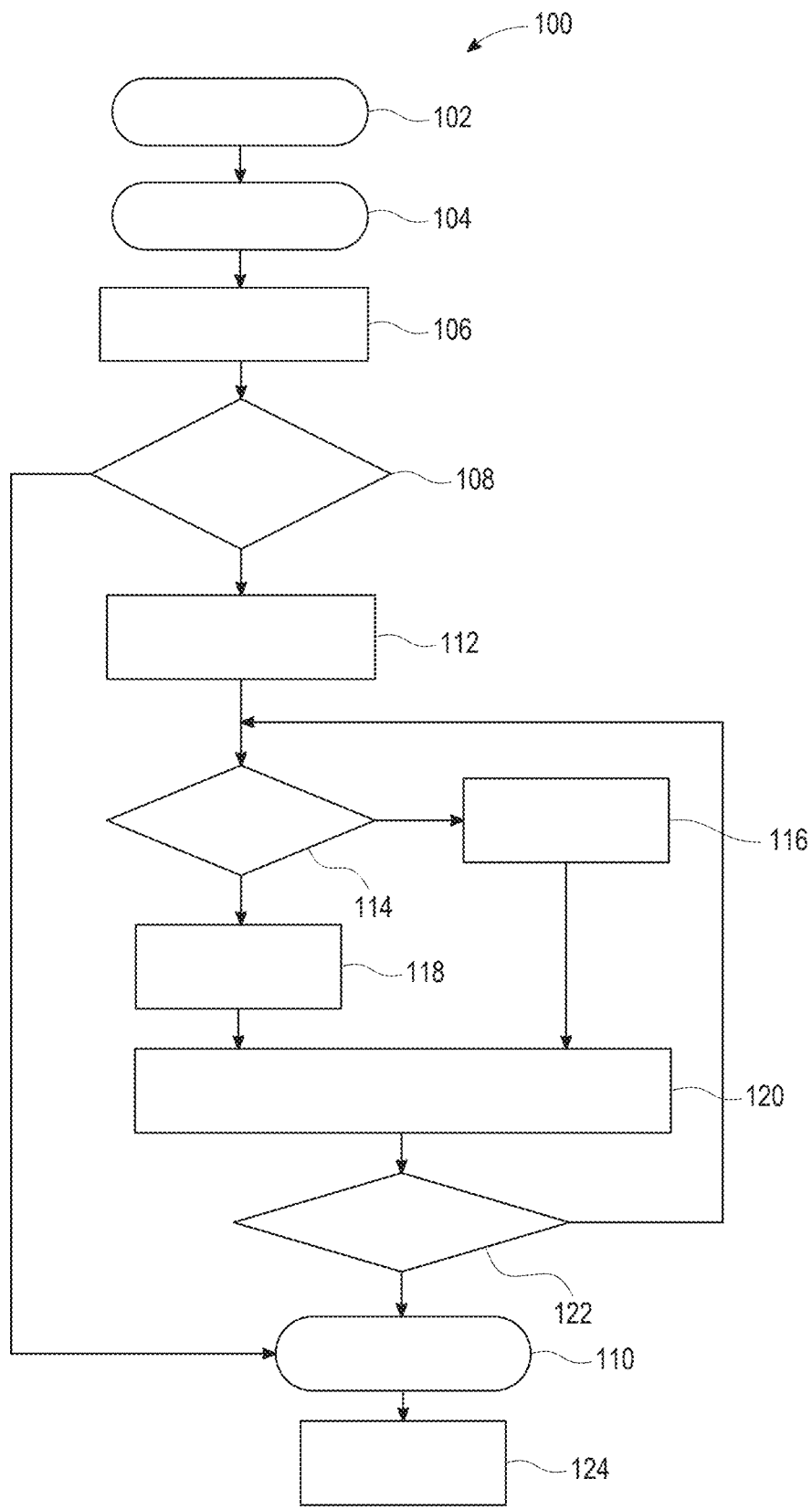
FIG. 3 is a parallel parking assist method.

FIG. 3 is a flowchart of a parallel parking assist method 100. The method 100 starts at block 102. At block 102, the system 11 initializes. At this juncture, the vehicle 10 is parked and in a neutral state. Then, the method 100 proceeds to block 104. At block 104, a person outside the vehicle 10 touches (e.g., knocks) the predetermined area 22 of the windshield 20 of the vehicle 10. The system 11 then detects such touch (e.g., knock) using one or more sensors 18. As discussed above, the sensor 18 may be in the form of a touchscreen that can detect a touch by the person outside of the vehicle 10. The sensor 18 generates sensor data. The sensor data is indicative that a person outside of the vehicle 10 touched (e.g., knock) the predetermined area 22 of the windshield 20 of the vehicle 10. The method 100 then continues to block 106.

At block 106, the controller 34 displays the user interface 23 on the predetermined area 22 of the windshield 20 in response to determining that the person outside of the vehicle 10 touched the predetermined area 22 of the windshield 20 of the vehicle 10. Alternatively, the user interface 23 may always be displayed on the predetermined area 22 of the windshield 20. Further, at block 106, the controller 34 sends an approval request to a vehicle user (e.g., vehicle owner) in response to determining that the person outside of the vehicle 10 touched the predetermined area 22 of the windshield 20 of the vehicle 10. The vehicle user is located in an area that is remote from the vehicle 10. The controller 34 may send the approval request to a mobile device 21 (e.g., smartphone or smart tablet shown in FIG. 1). The vehicle user may be in possession of the mobile device 21. The method 100 then continues to block 108.

At block 108, the controller 34 determines whether the vehicle user approved the use of the system 11. In response to receiving the approval request, the mobile device 21 may send an approval signal or a denial signal to the controller 34. The controller 34 may then determine that approval has been denied if the controller 34 receives the denial signal. If the approval request is denied, the method 100 proceeds to block 110. At block 110, the system 11 closes. After block 110, the method 100 continues to block 124. At block 124, the controller 34 notifies the vehicle user that the system 11 has closed. To do so, the controller 34 may send the notification to the mobile device 21. The controller 34 may then determine that approval has been granted if the controller 34 receives the approval signal. If the approval request is granted, the method 100 proceeds to block 112.

At block 112, the controller 34 activates one or more actuators 16 of the vehicle 10. For example, the controller 34 may initiate the propulsion system (e.g., electric motor and/or internal combustion engine) of the vehicle 10. In addition, the controller 34 commands the steering system of the vehicle 10 to align the wheels 14 in straight manner. Then, the method 100 continues to block 114.

At block 114, the controller 34 displays a "ready" message on the user interface 23. In addition, the controller 34 enables (e.g., displays) one or more buttons, such as the first arrow button 48, the second arrow button 50, and the stop button 50. Further, at block 114, the controller 34 receives one or more input from the person outside of the windshield 20 through the user interface 23. The input is indicative of a command to move the vehicle 10. The inputs may be "move forward" command (when the person actuates or presses the first arrow button 48), a "move rearward" command (when the person actuates or presses the second arrow button 50), and/or a "stop" command (when the person actuates or presses the stop button). The method 100 then proceeds to either block 116 or block 118.

At block 116, the controller 34 commands the vehicle 10 to move forward a predetermined distance (e.g., one and a half times the length of the vehicle 10) in response to receiving the input (i.e., "move forward" command) from the person outside of the vehicle 10. The method 100 then proceeds to block 120. At block 120, in response to receiving the "move forward" command, the vehicle 10 moves forward the predetermined distance. During vehicle movement, if an obstacle is detected by the obstacle detections sensor 18, the vehicle 10 automatically stops.

At block 118, the controller 34 commands the vehicle 10 to move rearward a predetermined distance (e.g., one and a half times the length of the vehicle 10) in response to receiving the input (i.e., "move rearward" command) from the person outside of the vehicle 10. The method 100 then proceeds to block 120. At block 120, in response to receiving the "move rearward" command, the vehicle 10 moves rearward the predetermined distance. During vehicle movement, if an obstacle is detected by the obstacle detections sensor 18, the vehicle 10 automatically stops. The method 100 then continues to block 120. Then, the method 100 continues to block 122.

At block 122, the controller 34 determines whether the person outside the vehicle 10 has inputted the "stop" command. The controller 34 then receives the "stop" command. In response to receiving the "stop" command, the controller 34 commands the vehicle 10 to stop even if the vehicle 10 has not traveled the predetermined distance e.g., one and a half times the length of the vehicle 10). Then, the vehicle 10 stops. Next, the method 100 continues to block 110. If the controller 34 does not receive the "stop" command, then the method 100 returns to block 114.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for externally moving a vehicle, comprising:
   receiving sensor data from a sensor of the vehicle, wherein the sensor data is indicative that a person outside of the vehicle touched a predetermined area of a windshield of the vehicle, and the vehicle is initially parked;
   in response to determining that the person outside of the vehicle touched the predetermined area of the windshield of the vehicle, displaying a user interface on the predetermined area of the windshield;
   receiving an input from the person outside of the windshield through the user interface, wherein the input is indicative of a command to move the vehicle; and in response to receiving the input from the person outside of the vehicle, commanding the vehicle to move by a predetermined distance.

2. The method of claim 1, further comprising:
sending an approval request to a vehicle user in response to determining that the person outside of the vehicle touched the predetermined area of the windshield of the vehicle;
wherein the vehicle user is at a location remote from the vehicle.

3. The method of claim 2, further comprising:
in response to sending the approval request to the vehicle user, receiving an approval signal from the vehicle user; and
in response to receiving the approval signal from the vehicle user, displaying a ready-message on the user interface.

4. The method of claim 3, wherein the user interface displays a first arrow button and a second arrow button, the first arrow button is indicative of a forward movement by the vehicle, the second arrow button is indicative of a backward movement by the vehicle.

5. The method of claim 4, wherein the user interface includes a touchscreen accessible from outside the vehicle.

6. The method of claim 5, wherein the user interface displays a stop button, and the first arrow button, the second arrow button, and the stop button are virtual images displayed on the predetermined area of the windshield of the vehicle.

7. The method of claim 6, further comprising:
receiving a stop command from the person outside of the vehicle after the vehicle has started to move, wherein the person outside the vehicle sends the stop command by pressing the stop button; and
in response to receiving the stop command, commanding the vehicle to stop.

8. A system for externally moving a vehicle, comprising:
a sensor configured to generate sensor data, wherein the sensor data is indicative that a person outside of the vehicle touched a predetermined area of a windshield of the vehicle, and the vehicle is initially parked;
a controller in communication with the sensor, wherein the controller is programmed to:
receive the sensor data from the sensor of the vehicle;
determine that the person outside of the vehicle touched the predetermined area of the windshield of the vehicle;
in response to determining that the person outside of the vehicle touched the predetermined area of the windshield of the vehicle, display a user interface on the predetermined area of the windshield;
receive an input from the person outside of the windshield through the user interface, wherein the input is indicative of a command to move the vehicle; and
in response to receiving the input from the person outside of the vehicle, command the vehicle to move by a predetermined distance.

9. The system of claim 8, wherein the controller is programmed to:
send an approval request to a vehicle user in response to determining that the person outside of the vehicle touched the predetermined area of the windshield of the vehicle, wherein the vehicle user is at a location remote from the vehicle.

10. The system of claim 9, wherein the controller is programmed to:

in response to sending the approval request to the vehicle user, receive an approval signal from the vehicle user; and
in response to receiving the approval signal from the vehicle user, display a ready-message on the user interface.

11. The system of claim 10, wherein the user interface displays a first arrow button and a second arrow button, the first arrow button is indicative of a forward movement by the vehicle, the second arrow button is indicative of a backward movement by the vehicle.

12. The system of claim 11, wherein the user interface includes a touchscreen accessible from outside the vehicle.

13. The system of claim 12, wherein the user interface displays a stop button, and the first arrow button, the second arrow button, and the stop button are virtual images displayed on the predetermined area of the windshield of the vehicle.

14. The system of claim 13, wherein the controller is programmed to:
receive a stop command from the person outside of the vehicle after the vehicle has started to move, wherein the person outside the vehicle sends the stop command by pressing the stop button; and
in response to receiving the stop command, command the vehicle to stop.

15. A vehicle, comprising:
a windshield;
a user interface displayed on the windshield;
a sensor configured to generate sensor data, wherein the sensor data is indicative that a person outside of the vehicle touched a predetermined area of the windshield of the vehicle;
a controller in communication with the sensor, wherein the controller is programmed to:
receive the sensor data from the sensor of the vehicle;
determine that the person outside of the vehicle touched the predetermined area of the windshield of the vehicle;
in response to determining that the person outside of the vehicle touched the predetermined area of the windshield of the vehicle, display the user interface on the predetermined area of the windshield;
receive an input from the person outside of the windshield through the user interface, wherein the input is indicative of a command to move the vehicle; and
in response to receiving the input from the person outside of the vehicle, command the vehicle to move by a predetermined distance.

16. The vehicle of claim 15, wherein the controller is programmed to:
send an approval request to a vehicle user in response to determining that the person outside of the vehicle touched the predetermined area of the windshield of the vehicle, wherein the vehicle user is at a location remote from the vehicle.

17. The vehicle of claim 16, wherein the controller is programmed to:
in response to sending the approval request to the vehicle user, receive an approval signal from the vehicle user; and
in response to receiving the approval signal from the vehicle user, display a ready-message on the user interface.

18. The vehicle of claim 17, wherein the user interface displays a first arrow button and a second arrow button, the first arrow button is indicative of a forward movement by the vehicle, the second arrow button is indicative of a backward movement by the vehicle.

19. The vehicle of claim 18, wherein the user interface includes a touchscreen accessible from outside the vehicle.

20. The vehicle of claim 19, wherein the user interface displays a stop button, and the first arrow button, the second arrow button, and the stop button are virtual images displayed on the predetermined area of the windshield of the vehicle.

* * * * *